United States Patent [19]

Niittylä et al.

[11] Patent Number: 4,869,463
[45] Date of Patent: Sep. 26, 1989

[54] LUBRICATION SYSTEM

[75] Inventors: Heikki Niittylä, Muurame; Hannu Trygg, Jyväskylä ; Juhani Ljokkoi, Muurame; Esko Poikolainen, Jyväskylä ; Raumo Vehmaa, Muurame, all of Finland

[73] Assignee: Oy Safematic Ltd., Muurame, Finland

[21] Appl. No.: 229,504

[22] Filed: Aug. 8, 1988

[30] Foreign Application Priority Data

Aug. 10, 1987 [FI] Finland .................................. 873459

[51] Int. Cl.⁴ .............................................. F16L 37/28
[52] U.S. Cl. ......................... 251/149.6; 137/614.03; 184/6.28; 184/36
[58] Field of Search ..................... 184/36, 6.28; 251/149.6; 137/614.04

[56] References Cited

U.S. PATENT DOCUMENTS

| | | | |
|---|---|---|---|
| 1,092,329 | 4/1914 | Berry | 184/36 |
| 1,944,191 | 1/1934 | Newmark et al. | 104/36 |
| 4,095,674 | 6/1978 | Kido et al. | 184/6.28 |
| 4,114,853 | 9/1978 | Medvick | 251/149.6 |
| 4,425,986 | 1/1984 | Wedlin | 184/6.28 |

FOREIGN PATENT DOCUMENTS

| | | |
|---|---|---|
| 462561 | 6/1928 | Fed. Rep. of Germany . |
| 563920 | 10/1932 | Fed. Rep. of Germany . |
| 2418424 | 4/1974 | Fed. Rep. of Germany . |

*Primary Examiner*—A. Michael Chambers
*Attorney, Agent, or Firm*—Cushman, Darby & Cushman

[57] ABSTRACT

A lubrication system for leading a lubricant from a lubrication unit to a point to be lubricated, the lubrication unit and said point being movable with respect to each other. The system comprises means for leading a quantity of the lubricant at predetermined intervals from the lubrication unit to the point to be lubricated. For reducing the demand for space, a fast coupler is provided for leading lubricant from the lubrication unit to the point to be lubricated. The fast coupler is arranged to be in a position allowing the flow when the lubrication unit and the point to be lubricated are interconnected and in a position preventing the flow when the lubrication unit and the point to be lubricated are detached from each other.

9 Claims, 2 Drawing Sheets

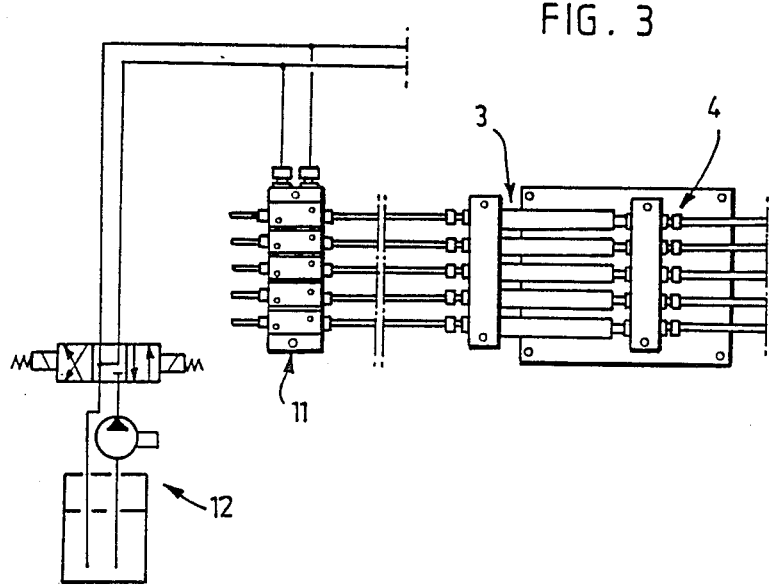
FIG. 3
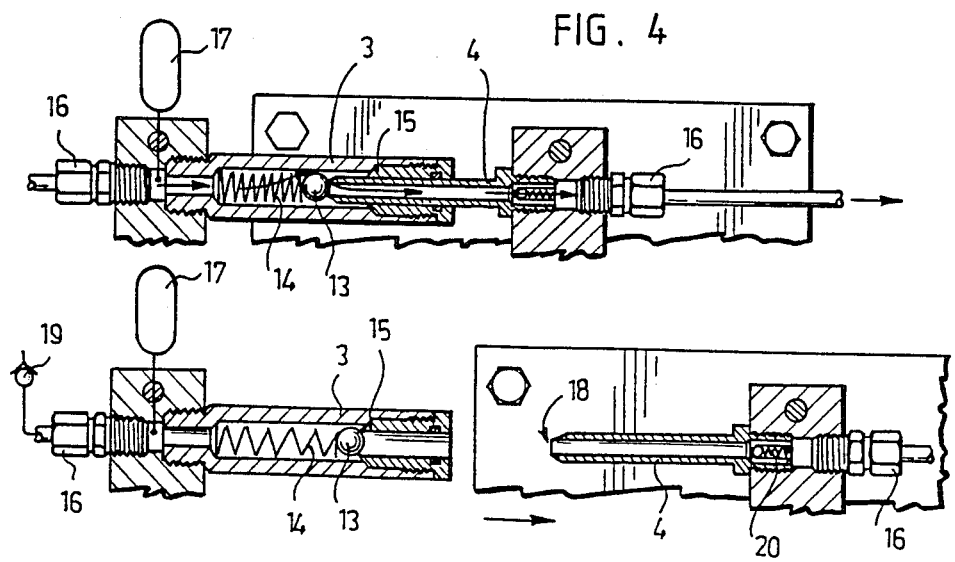
FIG. 4
FIG. 5

LUBRICATION SYSTEM

BACKGROUND OF THE INVENTION

The invention relates to a lubrication system for leading a lubricant from a lubrication unit to a point to be lubricated, the lubrication unit and the point to be lubricated being movable with respect to each other, whereby the system comprises means for leading a quantity of the lubricant from the lubrication unit to the point to be lubricated.

This kind of lubrication systems is today well-known in various industrial fields. Lubrication systems are used in machines, vehicles or like devices, which go intermittently to a fixed or movable post for automatic lubrication. Devices lubricated in this way include the movable carriages of bridge cranes, the gear systems of steam sweepers, automatic guided vehicles, industrial trucks, etc.

In lubrication systems known from the prior art, the leading of a lubricant from a lubrication unit to a point to be lubricated has been realized by means of spiral-shaped or looplike hoses or tubes operating on the telescope principle. A drawback of the use of hoses is that they are difficult to position and that in certain cases they are unreasonably long and have a great demand for space, which makes use impossible if the device to be lubricated moves over long distances. Tubes operating on the telescope principle have similar drawbacks.

In another lubrication system known from the prior art, the movable part is provided with its own separate lubrication system. A drawback is, however, high cost, since each one of the movable parts has to be provided with a separate independent control unit, a lubricant container, etc.

SUMMARY OF THE INVENTION

The object of the invention is to provide a lubrication system which avoids the drawbacks of the prior art. This is achieved by means of a lubrication system according to the invention, which is characterized in that the means for leading lubricant from the lubrication unit to the point to be lubricated comprise a fast coupling means which is arranged to be in a position allowing the flow when the lubrication unit and the point to be lubricated are interconnected and in a position blocking the flow when the lubrication unit and the point to be lubricated are detached from each other.

An advantage of the invention is its flexibility, as the invention can be applied for a large variety of purposes. For instance, the length of the movement of the device to be lubricated does not cause problems, such as a greater demand for space, or the like. Further advantages are low cost of manufacture and good operational reliability.

BRIEF DESCRIPTION OF THE DRAWINGS

In the following the invention will be described in more detail by means of the preferred embodiments of the invention shown in the attached drawing, wherein:

FIG. 3 shows a general view of another embodiment of the invention;

FIG. 4 shows a fast coupling application in the system according to the invention in a position allowing the flow of the lubricant; and FIG. 5 shows the fast coupling means of FIG. 4 in a position blocking the flow of the lubricant.

DETAILED DESCRIPTION

Figure 1:
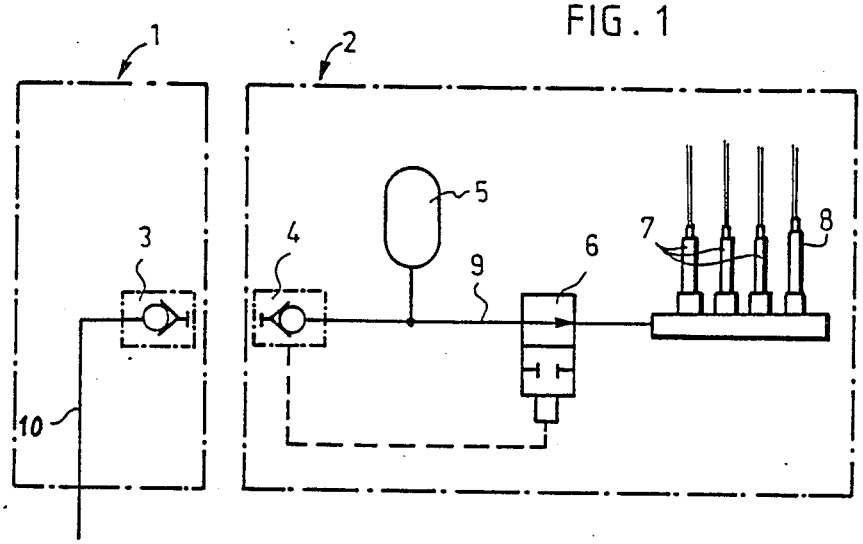
FIG. 1 is a general schematical view of one embodiment of the invention in a situation in which the point to be lubricated and the lubrication unit are separate from each other.
Figure 2:
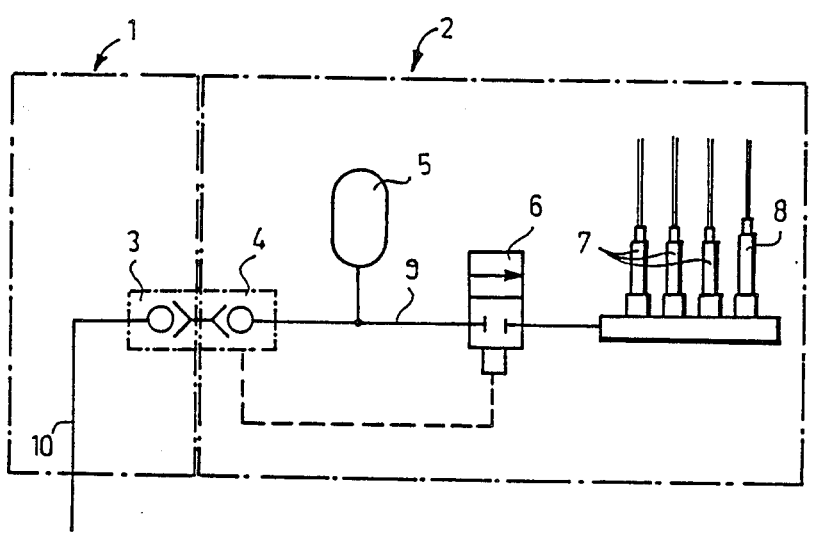
FIG. 2 shows the embodiment of FIG. 1 in a situation in which the point to be lubricated and the lubrication unit are interconnected.

FIGS. 1 and 2 show in a general schematical view of one embodiment of the lubrication system according to the invention. In FIGS. 1 and 2, the fixed part of the system is indicated generally with the reference numeral 1, and the movable part of the system respectively with the reference numeral 2. The fixed part comprises, among other things, a lubrication unit, such as a lubricant container, and other means required for transferring the lubricant. The fixed part 1 further comprises one part 3 of the fast coupling means, e.g. the female part.

The movable part 2, in turn, comprises the other part 4 of the fast coupling means, e.g. the male part; a pressure accumulator 5; a direction valve 6; and dosers 7 and 8 which distribute the lubricant to the respective points to be lubricated. These parts are further interconnected by a pipe connection 9.

In the system of FIGS. 1 and 2, the points to be lubricated in the movable part 2 are thus movable with respect to the lubrication unit in the fixed part 1.

Points to be lubricated and to which the system is connected receive a predetermined lubricant dose at predetermined intervals in the following way. The movable part 2 is displaced from the position of FIG. 1 to the position of FIG. 2, in which the parts 3, 4 of the fast coupling means are interlocked. In this position, the lubricant coming from the lubricant container (not shown in FIGS. 1 and 2) along a pipe connection 10 is able to flow through the fast coupling means 3, 4, and is stored in the pressure accumulator 5. The fast coupling means also guides the direction valve 6 into a position blocking the flow. The direction valve 6 opens when the parts 3, 4 of the fast coupling means are detached from each other. This situation is shown in FIG. 1. The lubricant stored in the pressure accumulator 5 is capable of discharging through the dosers 7, 8 to the points to be lubricated. The dosers 7 thereby give a predetermined dose of lubricant to the respective points. The remainder of the lubricant from the pressure accumulator 5 thereafter flows through the doser 8 to the point to be lubricated. Thereby, the pressure in the pipe connection 9 is reduced and the dosers are charged for a new lubrication cycle. The operation is repeated when the parts 3, 4 of the fast coupling means are again interlocked.

The fast coupling means, an essential feature of the invention, thus replaces prior hoses the use of which is completely impossible in certain cases.

The basic idea of the invention can also be utilized by positioning the fast coupling means in a lubrication pipe between the doser and the point to the lubricated, so that the pressure accumulator can be left out. This is possible in cases where the time period the movable device is away from its post is shorter than the pressurizing time of the lubricant of the fixed lubrication system or in cases where the device to be lubricated is in such a use that an occasional omission of the lubrication does not cause problems. FIG. 3 shows, general an embodiment in which the fast coupling means is arranged between the doser and the point to be lubricated.

In FIG. 3, the same reference numerals as in the embodiments of FIGS. 1 and 2 are used for corresponding parts. The parts of the fast coupling means are thus indicated with the reference numerals 3 and 4. In the embodiment of FIG. 3, the dosers are indicated generally with the reference numeral 11. In addition, the lubrication unit itself is indicated generally with the reference numeral 12 in FIG. 3. In the embodiment of FIG. 3, the parts 3, 11 and 12 of the system are mounted in the fixed part, and the part 4, in turn, in the movable part. The part 4 is further connected to points to be lubricated in the movable part. The operation of the embodiment of FIG. 3 is substantially similar to that described in connection with FIGS. 1 and 2 above.

In the embodiments of FIGS. 1, 2 and 3, it is possible to use, e.g., the fast coupling means shown in FIGS. 4 and 5. In FIGS. 4 and 5, the parts of the fast coupling means are indicated with the same reference numerals as above in connection with FIGS. 1 to 3. Accordingly, that part of the fast coupling means which is mounted in the fixed part is indicated with the reference numeral 3. The part 3 may be e.g. a tubular female part. That part of the fast coupling means which is mounted in the movable part is, in turn, indicated with the reference numeral 4. This part may be e.g. a tubular male part. In addition, a closing means 13 is provided within the tubular female part, which closing means is loaded by a spring member 14 into a position for blocking the flow. In the example of the figures, the closing means 13 is a ball which is arranged to be pressed against a counter face 15 in the closing position, thus closing the path of the flow. The parts 3 and 4 are connected to the pipe system by conventional nut connections 16.

When the fast coupling means are in the position of FIGS. 3 and 4 and the doser 11 is in operation, the lubricant doser flows through the fast coupling means to the point to be lubricated. When the fast coupling means is in the position shown in FIG. 5, that is, the parts 3, 4 are detached from each other, the spring-loaded ball 13 closes the passage of the lubricant out through the part 3 of the fast coupling means. The lubricant dose may thereby be stored in a pressure accumulator 17, for instance. When the parts of the fast coupling means are again interlocked, the parts 3 and 4 are first sealed together, whereafter the part 4 presses the ball 13 off the counter face 15 while resisted by the force of the spring member 14. The point of the part 4, i.e. the surface which is arranged to be pressed against the ball 13, is provided with a small groove 18 through which the lubricant dose is able to flow through the part 4 as shown in FIG. 4. The passage of the lubricant in the direction of the doser can be blocked e.g. by means of a counter valve 19. Similarly, the passage of the lubricant from the point to be lubricated to the pressure accumulator can be prevented by means of a counter valve 20.

The above-mentioned embodiments are by no means intended to restrict the invention, but it is obvious that the invention can be modified within the scope of the claims in various ways. The invention can thus also be applied in such a way that the point to be lubricated is fixed and the lubrication unit is movable. The lubrication systems of the figures can also be connected to form part of a larger central lubrication system. Technical details may also vary. Accordingly, the pressure accumulator shown in FIGS. 4 and 5, for instance, can be omitted.

We claim:

1. A lubrication system, comprising:
   a fixed-location part, including:
   at least one first member of a fast coupler disposed at a connection site, and
   a supply of pressurized lubricant connected with each said first fast coupler member by first pipe means; and
   a movable-location part, including:
   at least one point to be lubricated,
   at least one second member of a fast coupler movable with said movable-location part between one position wherein each said second fast coupler member is disposed at said connection site and operatively connected with a respective said first fast coupler member, and another position in which each said second fast coupler member is spaced apart from said connection site and disconnected from a respective said first fast coupler member, and
   second pipe means connecting each said second fast coupler member with a respective said point to be lubricated;
   each said first fast coupler member being constructed to be automatically opened by connection with a respective said second fast coupler member as the respective said second fast coupler member is moved to said connection site and thereby into operative connection with a respective said first fast coupler member, and to be automatically closed by disconnection from a respective said second fast coupler member as the respective said second fast coupler member is moved away from said connection site and thereby disconnected from a respective said first fast coupler member.

2. The lubrication system of claim 1, wherein:
   said at least one point to be lubricated comprises a plurality of said points to be lubricated;
   said system comprises a single said second fast coupler member; and
   said second pipe means divides into a respective plurality of doser lines between said single said second fast coupler member and said plurality of points to be lubricated.

3. The lubrication system of claim 2, wherein:
   said second fast coupler member operatively connects with and disconnects from the respective said first fast coupler member by axial movement with respect thereto.

4. The lubrication system of claim 2, further comprising:
   a pressure accumulator incorporated in said second pipe means between said second fast coupler member and said points to be lubricated; and
   a direction valve incorporated in said second pipe means between said pressure accumulator and said points to be lubricated;
   said direction valve being operatively connected with said second fast coupler member to be automatically closed upon connection of said second fast coupler member with a respective said first coupler member and automatically opened upon disconnection of said second fast coupler member from a respective said first coupler member, whereby, upon connection of said first and second coupler members, lubricant is accumulated in said pressure accumulator but prevented from flowing to said points to be lubricated and thereafter, upon disconnection of said first and second coupler member, lubricant which has accumulated in said pressure accumulator is permitted to flow to said points to be lubricated.

5. The lubrication system of claim 1, further comprising:
- a pressure accumulator incorporated in said second pipe means between each said second fast coupler member and each respective said point to be lubricated; and
- a direction valve incorporated in said second pipe means between said pressure accumulator and each said point to be lubricated;
- said direction valve being operatively connected with each said second fast coupler member to be automatically closed upon connection of each said second fast coupler member with a respective said first coupler member and automatically opened upon disconnection of each said second fast coupler member from a respective said first coupler member, whereby, upon connection of said first and second coupler members, lubricant is accumulated in said pressure accumulator but prevented from flowing to each said point to be lubricated and thereafter, upon disconnection of said first and second coupler members, lubricant which has accumulated in said pressure accumulator is permitted to flow to each said point to be lubricated.

6. The lubrication system of claim 1, wherein:
said at least one point to be lubricated comprises a plurality of said points to be lubricated;
said system comprises a plurality of said second fast coupler members and a respective plurality of said first fast coupler members;
said first pipe means divides into a plurality of respective doser lines between said supply of pressurized lubricant and said first fast coupler members; and
said second pipe means comprises a respective plurality of second pipes connecting respective of said second fast coupler members with respective of said points to be lubricated.

7. The lubrication system of claim 6, wherein:
said second fast couplers operatively connect with and disconnect from the respective said first fast coupler members by axial movement with respect thereto.

8. The lubrication system of claim 6, further comprising:
- a pressure accumulator incorporated in said first pipe means between said supply of pressurized lubricant and each said first fast coupler member whereby lubricant can be accumulated in said pressure accumulator while said first and second fast coupler members are disconnected, for being supplied from said fixed-location part to said movable location part upon connection of said first and second fast coupler members.

9. The lubrication system of claim 1, wherein:
in use, the movable part is periodically moved between said one and other positions thereof, thereby moving said at least one second fast coupler member axially into and from connection with the respective said at least one first fast coupler member.

* * * * *